Oct. 9, 1962    W. S. KREISMAN    3,057,204
GAS PRESSURE MEASUREMENT
Filed Sept. 15, 1959
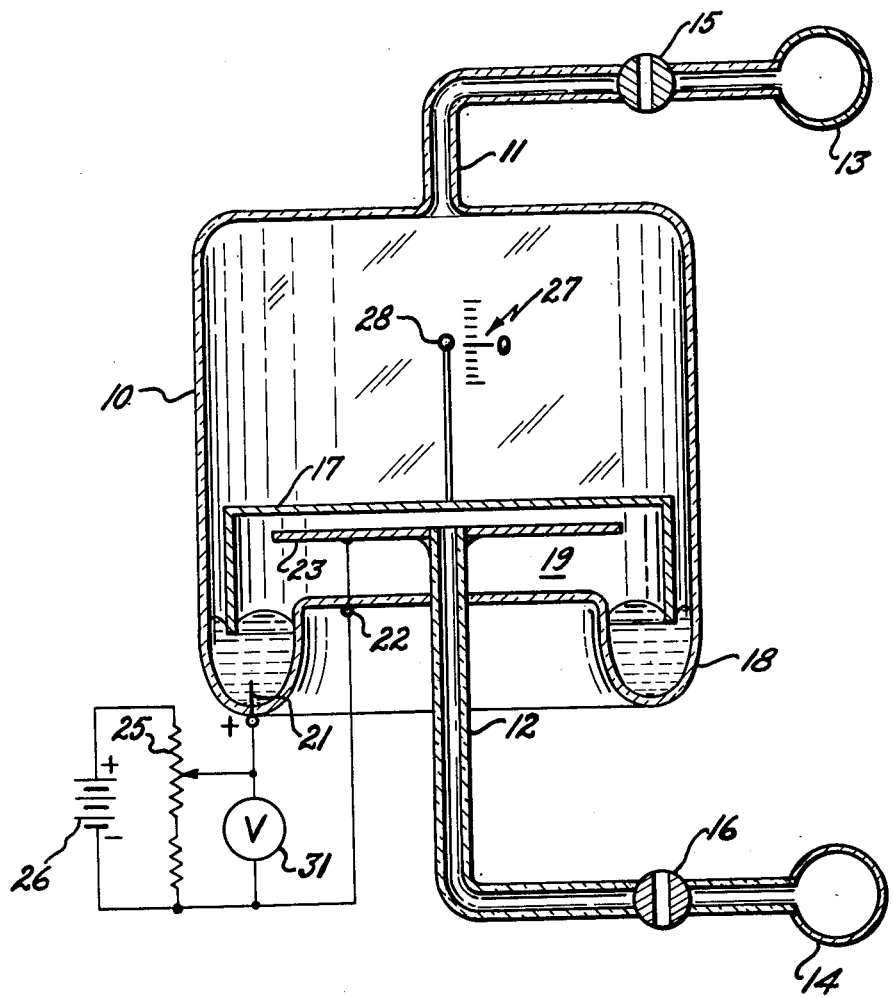
INVENTOR.
WALLACE S. KREISMAN
BY Wade Koontz
George Fincher
ATTORNEYS 3,057,204
Patented Oct. 9, 1962

3,057,204
GAS PRESSURE MEASUREMENT
Wallace S. Kreisman, Malden, Mass., assignor to the United States of America as represented by the Secretary of the Air Force
Filed Sept. 15, 1959, Ser. No. 840,211
3 Claims. (Cl. 73—398)
(Granted under Title 35, U.S. Code (1952), sec. 266)

The invention described herein may be manufactured and used by or for the United States Government for governmental purposes without payment to me of any royalty thereon.

This invention relates to absolute high vacuum gauges and more particularly to a gauge measuring and indicating extremely low pressures.

The present invention provides an apparatus whereby extremely low pressures in the order of $10^{-8}$ mm. of mercury are measured and indicated. This pressure region is out of the range of the prior art gauges. By an "absolute" gauge is meant one whose calibration depends only on measurements of length, mass, and time. The commonly used ionization, cold cathode discharge, pirani, thermocouple, and alphation gauges must all be calibrated against an absolute type of gauge. One of the prior art gauges should supply readings down to $10^{-6}$ mm. of mercury, but in actuality the readings become erratic and unreliable below a pressure of $10^{-4}$ mm. of mercury. The chief difficulty with aforesaid gauge is that for low pressures the liquid tends to stick in the fine capillaries. There is also difficulty in obtaining the proper height of liquid in one of the capillaries and in reading the liquid meniscus.

The Absolute High Vacuum gauge of the present invention eliminates the aforesaid described sticking. In addition thereto, it provides means for magnifying pressure. This permits lower pressure measurements in an absolute fashion.

A further improvement in the prior art gauges results in a null type of balanced apparatus. The pressure force which would ordinarily give rise to a mechanical displacement is balanced out by a counter force. The magnitude of the balancing force is a measure of the pressure in the gauge.

An important feature of the present invention is the means for confining the direction of the mechanical movement of the movable elements within the pressure gauge so that the pressure of the gas being measured causes aforesaid elements to be raised or lowered absolutely in vertical.

An object of the present invention is to provide a novel apparatus for measuring and indicating extremely low pressures of gases.

A further object of the present invention is to provide an absolute high vacuum gauge measuring and indicating low pressures of gases.

A still further object of the present invention is to provide an absolute high vacuum gauge having a "null type" of balancing.

Yet a further object of the present invention is to provide an apparatus for an absolute high vacuum gauge including movable elements therein whose movements are restricted to the vertical direction.

A still further object of the present invention is to provide an apparatus for an absolute high vacuum gauge including movable elements therein whose movements are restricted to the vertical direction and the magnitude of vertical movement caused by gas pressure is balanced out by a counter force to achieve a null condition.

These and other objects and advantages of this invention, which will be in part obvious and in part pointed out hereinafter, are obtained by the means described in the following specification, and may be more readily understood by reference to the accompanying drawing, showing one of the various possible embodiments of this invention in which there is shown glass vessel 10 having glass conduits 11 and 12 leading to a vacuum pump 13 and an alternate gas source and vacuum pump 14, respectively, the evacuation of air or other gases from vessel 10 being controllable by valve 15 and the evacuation or admission of gas from alternate gas source and vacuum pump 14 being controllable by a valve 16. Within vessel 10 is buoyant element 17 in the form of an inverted cup making contact with a quantity of mercury substantially filling an annular bottom section 18 of the vessel 10, thereby creating a confined chamber 19 for holding the volume of gas admitted thereto by way of conduit 12. Buoyant element 17 is formed from stainless steel.

A measuring circuit includes electrodes 21 and 22, the former of which terminates within the mercury pool, while the latter makes electrical contact with conductive disc 23 integrated with the upper end of conduit 12 so that the magnitude of gas pressure acting upwardly upon the under surface of float 17 may be reflected electrically in accordance with the electrical load applied to the measuring circuit under the control of variable resistance element 25 and source 26. This pressure, of course, determines the position of float 17, which position may be indicated by suitable gauge 27 including an index element 28 extending upwardly from float 17. Gauge 27 may be etched on glass vessel 10.

In operation glass vessel 10 and chamber 19 are evacuated to the desired degree, that is, index element 28 registers with the zero reading in scale 27. Thereupon gas is admitted to chamber 19 under control of valve 16, and resistor 25 is adjusted to the degree necessary to hold index element 28 on aforesaid zero reading. When equilibrium has been established, the observer will read the applied voltage on meter 31 which if desired may be calibrated in terms of gas pressure prevailing in chamber 19.

The mode of operation within glass vessel 10 is such that the pressure force of the gas admitted to chamber 19 gives rise to a vertical, upward, mechanical displacement of buoyant element 17. The magnitude of displacement is a measure of the pressure of the admitted gas. The aforesaid mechanical displacement is balanced out in this instance, by a calibrated electrical force. The magnitude of the balancing force is a measure of the pressure. The balancing electrical force results from applying a positive voltage to stainless steel buoyant element 17 and a negative voltage to conductive disc 23 of such magnitude that the electrostatic force of attraction between the upper surface of disc 23 and bottom surface of element 17 is such that it is equal in magnitude, but in opposite direction, to that of the pressure force of the gas admitted into chamber 19. A null type of balancing results in which the pressure force of a gas being tested is counter-balanced by an electrostatic force.

The construction of vessel 10 in such manner as to provide the annular bottom section 18 for the mercury pool, with float 17 having a circumferential dimension approaching that of vessel 10, has the advantage of establishing a viscous damping and fluid locking effect upon said float 17, since the tendency of mercury when confined in narrow annular spaces such as prevails between the walls of bottom section 18 and the walls of float 17 creates a capillary condition which effectively resists any tendency of the float to shift its position laterally of its axis; thus constraining the float to vertical motion only. This is an important advantage as it improves stability and therefore accuracy as well as reducing time consumption in each observation cycle.

While, in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Apparatus for determining significant characteristics of a gas such as the pressure thereof, said apparatus comprising, in combination with a first vessel source containing the gas, a second vessel containing a quantity of mercury in an annular bottom section thereof, a bowl shaped electrically conductive buoyant element having the open end thereof extending into the mercury contained in said bottom section so as to define a sealed chamber above the surface level of said mercury, said buoyant element being centered within said second vessel so as to create a capillary depression in said mercury thereby restricting the movement of said buoyant element solely to the vertical, means attached to said buoyant element for indicating the zero position of said buoyant element in relation to said mercury level, means for evacuating said second vessel exclusive of said chamber, means for introducing into said buoyant element chamber a quantity of gas from said gas source, a balancing electrode positioned below said buoyant element and electrically spaced therefrom, means constituted in part by said quantity of mercury to impress between said balancing electrode and said buoyant element a voltage of high potential, and means to vary the magnitude of said impressed voltage to retain said indicating means at said zero position, said variation of said impressed voltage occurring after the introduction of said gas into said chamber, the magnitude of the impressed voltage being directly dependent upon said gas pressure characteristics, and means to measure the magnitude of said impressed voltage.

2. Apparatus for determining significant characteristics of a gas such as the pressure thereof, said apparatus comprising, in combination with a first vessel source containing the gas, a second vessel containing a quantity of mercury in an annular bottom section thereof, a bowl shaped electrically conductive buoyant element having the open end thereof extending into the mercury contained in said bottom section so as to define a sealed chamber above the surface level of said mercury, said buoyant element within said second vessel thereby creating a capillary depression in said mercury of such magnitude as to restrict the movement of said buoyant element solely to the vertical direction, means for evacuating said second vessel exclusive of said chamber, means for indicating the zero position of said buoyant element in relation to said mercury level, means for introducing into said buoyant element chamber a quantity of gas from said gas source, a balancing electrode positioned below said buoyant element and electrically spaced therefrom, said balancing electrode being immovable, and means constituted in part by said quantity of mercury to impress between said buoyant element and said balancing electrode a balancing electrostatic force to retain said indicating means at said zero position, said electrostatic force being applied after the introduction of said gas into said chamber, the magnitude of said electrostatic force being directly dependent upon said gas pressure characteristics, and means to measure the magnitude of said balancing electrostatic force.

3. Apparatus for determining significant characteristics of a gas such as the pressure thereof, said apparatus comprising, in combination with a first vessel source containing the gas, a second vessel containing a quantity of mercury in an annular bottom section thereof, a bowl shaped electrically conductive buoyant element having the open end thereof extending into the mercury contained in said bottom section so as to define a sealed chamber above the surface level of said mercury, said buoyant element within said second vessel establishing a capillary depression in said mercury so as to confine the movement of said buoyant element in said mercury solely to the vertical direction, means for evacuating said second vessel exclusive of said chamber, means for indicating the zero position of said buoyant element in relation to said mercury level, means for introducing into said buoyant element chamber a quantity of gas from said first vessel, a balancing electrode positioned below said buoyant element and electrically spaced therefrom, said balancing electrode being immovable, means constituted in part by said quantity of mercury to impress an electrostatic force between said balancing electrode and said buoyant element, means to vary the magnitude of said impressed electrostatic force to retain said indicating means in said zero position after said introduction of said gas into said chamber, the magnitude of said electrostatic force being directly dependent upon said gas pressure characteristics, and means to indicate the magnitude of said electrostatic force.

References Cited in the file of this patent

UNITED STATES PATENTS

| | | |
|---|---|---|
| 1,877,810 | Chamberlain | Sept. 20, 1932 |
| 1,909,254 | Crowell | May 16, 1933 |
| 2,243,749 | Clewell | May 27, 1941 |
| 2,620,666 | Schmidt | Dec. 9, 1952 |